UNITED STATES PATENT OFFICE.

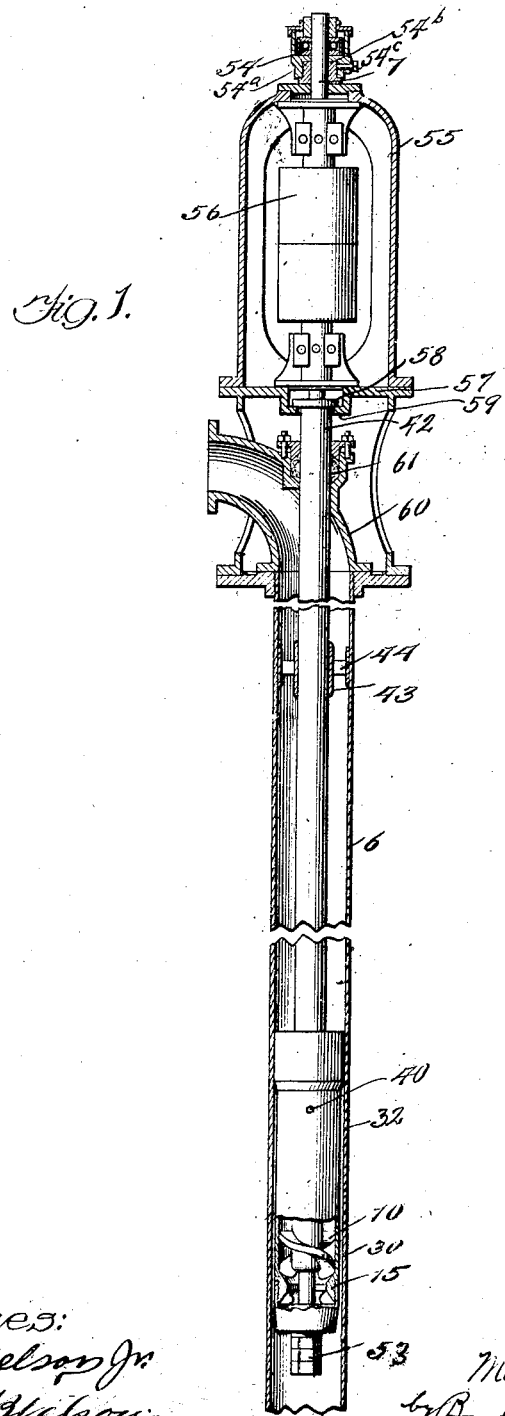

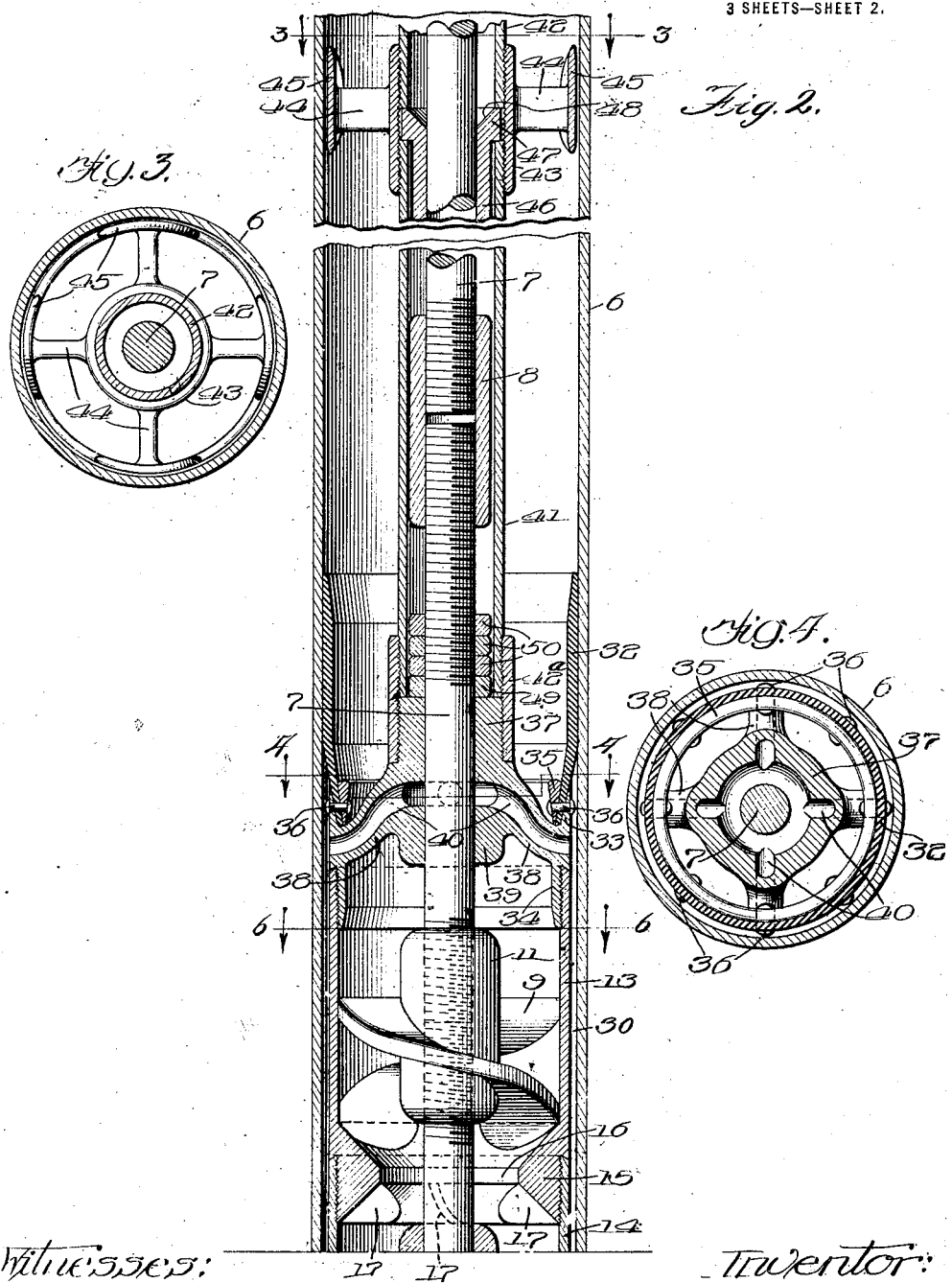

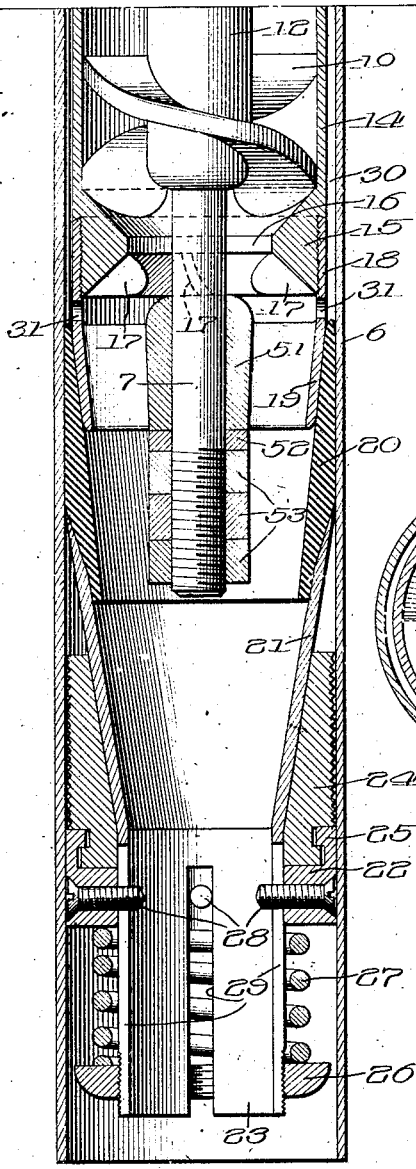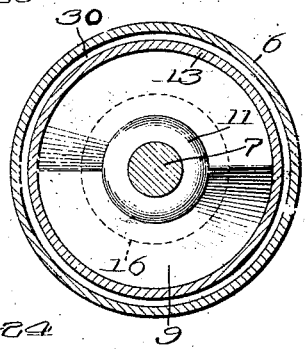

MATTHEW T. CHAPMAN, OF AURORA, ILLINOIS, ASSIGNOR TO THE AMERICAN WELL WORKS, OF AURORA, ILLINOIS, A CORPORATION OF ILLINOIS.

PUMP.

1,170,512.   Specification of Letters Patent.   Patented Feb. 8, 1916.

Application filed May 4, 1911. Serial No. 625,014.

*To all whom it may concern:*

Be it known that I, MATTHEW T. CHAPMAN, a citizen of the United States, residing at Aurora, in the county of Kane and State of Illinois, have invented certain new and useful Improvements in Pumps, of which the following is a specification, reference being had to the accompanying drawings.

My invention relates to pumps for deep wells, and has particularly for its object to provide an improved pump of the centrifugal type peculiarly adapted for use in small wells. I accomplish this object as illustrated in the accompanying drawings and as hereinafter described.

What I regard as new is set forth in the claims.

In the accompanying drawings, Figure 1 is a vertical section, illustrating the invention; Fig. 2 is a sectional view of a part of a well-tube, illustrating the upper portion of my improved pump; Fig. 3 is a cross-section on line 3—3 of Fig. 2; Fig. 4 is a cross-section on line 4—4 of Fig. 2; Fig. 5 is a vertical section of the lower portion of my improved pump; and Fig. 6 is a cross-section on line 6—6 of Fig. 2.

My improved pump relates to that class of rotary pumps in which the well-tube is used as an outlet pipe for the water raised by the pump, and comprises a rotary pump rod or shaft which extends down through the well-tube and carries one or more runners each of which is mounted to rotate in a cylinder provided inside the well-tube, the several cylinders being connected in series so that the water passes consecutively from the lower to the upper cylinders and finally to the well-tube. The several cylinders are suspended in the well-tube by a casing which incloses the pump-shaft, and above the top cylinder, and, when a foundation is provided below the pumping mechanism, below the bottom cylinder also, packing is provided between the respective cylinders and the well-tube so that an intermediate chamber is formed which surrounds the several cylinder sections. The upper end of this chamber communicates through suitable passages with the surface of the pump-shaft below a bearing therefor provided above the uppermost runner, and also communicates with the well-tube at its lower end, which is below the lowermost runner, so that water and the sediment carried thereby, are prevented from gaining access to and cutting out the pump-shaft bearings. The casing above referred to protects the upper portion of the pump-shaft from the water and sediment and provides means by which the bearings thereof may be lubricated. I also provide means for centering the shaft bearings at other points.

As shown in Fig. 1, 6 indicates the well-tube and 7 the pump rod or shaft. Said pump-shaft may be made in any desired number of sections which are united by couplings 8 in the form of screw-threaded sleeves in which the ends of the shaft sections are screwed. 9—10 indicate runners arranged at suitable intervals upon the pump-shaft and connected with screw-threaded sleeves 11—12 by which they are secured to the shaft. The runners 9—10 are mounted, respectively, in cylinders 13—14, which, as shown in Figs. 2 and 5, are coupled together in series, each cylinder having screw-threads at its upper end and a screw-threaded extension 15 of reduced diameter at its lower end adapted to screw into the upper end of the next lower cylinder. The lower end of each cylinder is also of reduced internal diameter, by the use of an annular ring 16 formed with the extension 15, to provide a throat through which the water passes up to the runner. Inwardly-projecting webs 17 are also provided at the lower end of each cylinder section to stop the circulatory motion of the water and direct it properly in the overlying cylinder. 18 indicates a sleeve, which, when a foundation is used to support the pumping mechanism from below, is screwed upon the extension 15 of the lowermost cylinder 14 and is tapered at its lower end, as shown at 19 in Fig. 5, to fit into and expand the upper portion of a tubular packing 20, which is preferably of rubber. The lower end of the packing 20 fits into a tapered sleeve 21 which forms a part of a foundation which helps to support the pump in the well-tube. Said foundation is preferably of the construction shown and described in the application of Matthew T. and Mark C. Chapman, Serial No. 589,216, and forms no part of my present invention, but, for convenience, it may be explained that it comprises the sleeve 21, a ring 22 adapted to slide upon a reduced cylindrical extension 23 of said sleeve, wedges 24 connected with the ring 22 by a flange 25, a collar 26 screwed upon the lower end of the cylinder 23, a spring 27 mounted between the collar 26 and the ring 22, and screws 28 which extend through the ring 22 and through longitudinal slots 29 in the cylinder 23. The arrangement of the foundation is such that by means of a suitable tool which engages the inner ends of the screws 28 the foundation may be lowered in the well to the desired point, when the tapered sleeve 21 will act to move the wedges 24 outward so that they will tightly engage and bind against the well-tube, preventing the foundation from descending farther. The packing 20 fits into the upper end of the tapered sleeve 21, and being expanded by the lower end of the sleeve 18, forms a tight closure at the lower end of a chamber 30 formed between the cylinder sections 13 and 14 and the well-tube 6, as shown in Fig. 5. When the packing 20 is used holes 31 are provided in the cylinder 18 above the packing 20 and below the cylinder 14 to afford communication between the lower end of the chamber 30 and the interior of the well below the lowermost runner 10.

The upper end of the chamber 30 is closed tightly by a packing sleeve 32 which fits tightly in the well-tube 6 and is connected at its lower end with an upwardly-projecting flange 33 carried by a tubular coupling 34 which is secured, preferably by screwing, to the upper end of the uppermost cylinder 13, as shown in Fig. 2. The packing sleeve 32 is also of rubber or other suitable material, and it is clamped in position by a ring 35 secured by rivets 36 to the flange 33.

The coupling 34 is provided with an upward extension 37 connected to it by radial arms 38, said extension forming a bearing for the pump-shaft 7. It is also provided with a downward extension 39 below the arms 38, which also forms a bearing for the shaft 7. Passages 40 are provided in the arms 38, said passages extending from the shaft 7 to the upper portion of the chamber 30—the purpose of said passages being to conduct any water that passes up between the bearing 39 and the shaft out and deliver it to the chamber 30, whence it may pass down and through the openings 38 back into the well-tube below the lowermost runner 10. Thus the admission of water and sediment into or above the bearing 37 is prevented, so that cutting out of the bearing is avoided.

41—42 indicate casing sections or tubes which inclose the pump-shaft 7 above the bearing 37 and protect it from water passing out from the well-tube 6. The lower casing section 41 is connected with the bearing 37 by a sleeve 42ª and its upper end is connected by a coupling sleeve 43 with the next casing section 42 above it. The sleeve 43 is provided with radial webs 44 having bearing plates 45 at their outer ends which bear against the inner walls of the well-tube and serve to center the casing sections 41—42 in the well-tube.

46 indicates a bearing for the pump-shaft, which is fitted within the casing section 41 and is held in position by means of the casing sections 41—42, it being provided with a flange 47 at its upper end which fits between the adjoining ends of said casing sections, as shown in Fig. 2. By screwing the casing sections far enough into the coupling sleeve 43 they may be made to bind tightly upon the flange 47, thereby holding the bearing 46 from rotating. As shown at 48 in Fig. 2, the upper surface of the bearing 46 is made funnel-shaped to receive a lubricant and direct it down between the bearing and the shaft 7 to oil the lower bearing. Thus a supply of lubricant placed in the recess formed in the upper face of the bearing 46 for the purpose, or the excess of lubricant falling into said recess from the bearing at the top of the casing, will pass down through the casing 41, between the shaft and the bearings lubricating the bearings and passing out through the passages 40 leading to the water supply passage of the pump through the openings 31.

49 indicates a thrust-block mounted on the shaft 7 above the bearing 37, and 50 indicates lock-nuts screwed upon said shaft above the thrust-block 49. The lower end of the pump-shaft 7 is mounted in a bearing 51 carried by the sleeve 19 so that the lower end of said shaft is properly centered.

52 indicates a bearing block mounted on the lower end of the pump-shaft below the bearing 51, and 53 indicates nuts screwed on the lower end of the pump-shaft, thereby securing the several cylinders properly upon the pump-shaft.

The several cylinder sections are suspended in the well-tube through their attachment to the pump-shaft casing 41—42, which, as shown in Fig. 1, is itself suspended from a base 57, the uppermost casing section 42 being provided with a collar 58 which rests upon a flange 59 with which the base 57 is provided. The pump-shaft 7 extends up through the base 57 and is adjustably supported at or near its upper end by a ball-bearing 54 mounted upon a collar 54ª having a screw-threaded connection with a plate 54ᵇ carried by a frame 55 which extends up from the base 57, as shown in Fig. 1. A set-screw 54ᶜ is employed for locking the collar 54ª against turning on the plate 54ᵇ. A motor 56 or other driving device is mounted upon the upper end of the shaft for rotating the same.

60 indicates a discharge-pipe which forms a continuation of the well-tube 6, and 61 indicates a stuffing-box carried by said discharge-pipe and surrounding the casing section 42 which it passes through said discharge-pipe, as shown in Fig. 1. Ordinarily it will be sufficient to support the cylinder sections of the casing sections 41—42 alone, but, as shown in Fig. 5, a foundation may be used to advantage, since it holds the lower end of the pumping mechanism properly centered in the well-tube, and, moreover, forms a means of intercepting and supporting the pumping mechanism in case of breakage of the pump-shaft or either of the casing sections.

In placing the apparatus in the well, after the foundation has been lowered to the proper point, the casing having the proper number of cylinder sections attached to it and the pump-shaft equipped with the desired number of runners is lowered into the well. The runners are lowered to a point where they are below the level of the standing water in the well so that when the pump-shaft is rotated the water is raised by the runners and forced out through the well-tube. Any water that may pass up between the bearing 39 and the pump-shaft escapes to the chamber 31 through the passages 40, and the suction of the runners causes it to flow down through said chamber into the well-tube, where it is raised and discharged through the outlet with the main body of water.

The bearing-plates 45 are extended vertically beyond the webs 44 so as to have an extended bearing on the inner walls of the well-tube in order to enable said plates to ride properly over the joints in the well-tube, which, as is usual, is composed of sections coupled together.

That which I claim as my invention, and desire to secure by Letters Patent, is,—

1. The combination of a well tube through which the liquid pumped is discharged, a rotary pump shaft in said well tube, a casing in said well tube about said shaft, a runner carried by said shaft, a cylinder about said runner below said casing having its walls spaced away from the walls of the well tube, and a packing between the upper end of said cylinder and said well tube, the annular space between said cylinder and said well tube being at its upper end in communication with the interior of said casing and at its lower end in communication with the interior of the cylinder below the runner.

2. The combination of a well-tube, a casing, a rotary pump-shaft therein, a runner carried by said shaft, a cylinder in which said runner rotates, said cylinder being supported by said casing, a chamber between the cylinder and the well-tube, and packing between the upper portion of the cylinder and the well-tube.

3. The combination with a well-tube, of a rotary pump comprising a rotary shaft having pumping runners mounted thereon and rotating therewith, a casing for said shaft, pump cylinders in which said runners rotate, and packing between the uppermost pump cylinder and the well-tube.

4. The combination with a well-tube, of a rotary pump comprising a rotary shaft having pumping runners mounted thereon and rotating therewith, a casing for said shaft, pump cylinders in which said runners rotate, said pump cylinders being supported by said casing, and packing between the uppermost pump cylinder and the well-tube.

5. The combination with a well-tube, of a rotary pump comprising a rotary shaft having pumping runners mounted thereon and rotating therewith, a casing for said shaft, pump cylinders in which said runners rotate, said pump cylinders being supported by said casing, packing between the uppermost pump cylinder and the well-tube, and a foundation below the pumping mechanism.

6. The combination with a well-tube, of a rotary pump comprising a rotary shaft having pumping runners mounted thereon and rotating therewith, a casing for said shaft, pump cylinders in which said runners rotate, said pump cylinders being supported by said casing, packing between the uppermost pump cylinder and the well-tube, and a foundation supporting said cylinders from below.

7. The combination with a well-tube, of a rotary pump comprising a rotary shaft having pumping runners mounted thereon, pump cylinders in which said runners rotate, a chamber between said cylinders and the well-tube, means separating the upper portion of said chamber from the well-tube and a foundation supporting said cylinders from below, the lower portion of said chamber communicating with the well-tube.

8. The combination with a well-tube, of a rotary pump comprising a rotary shaft having pumping runners mounted thereon, pump cylinders in which said runners rotate, a chamber between said cylinders and the well-tube, a foundation supporting said cylinders from below, the lower portion of said chamber communicating with the well-tube, and a casing inclosing said shaft and supporting the cylinders from above.

9. The combination with a well-tube, of a pump comprising a rotary pump-shaft, a runner mounted thereon, a cylinder within the well-tube in which said runner rotates, said cylinder being of reduced diameter and forming with the well-tube a chamber, and a passage extending from the pump-shaft above the runner to said chamber.

10. The combination with a well-tube, of a pump comprising a rotary pump-shaft, a runner mounted thereon, a cylinder within the well-tube in which said runner rotates, said cylinder being of reduced diameter and forming with the well-tube a chamber, a passage extending from the pump-shaft above the runner to said chamber, said chamber communicating with the well-tube below the runner.

11. The combination with a well-tube, of a pump-shaft extending down into the well, one or more runners carried by said shaft, a corresponding number of cylinders forming pumping sections surrounding said runners, said cylinders communicating with one another in series, means supporting said cylinders, and packing in the well-tube between the uppermost pumping section and the well-tube.

12. The combination with a well-tube, of a foundation secured therein, a packing sleeve above said foundation, a tapered sleeve engaging said packing, a cylinder section connected with said sleeve, a pump-shaft extending through said cylinder section and having a runner carried thereby, a bearing for said shaft carried by said sleeve, an upper bearing for said shaft above the runner, and packing between the upper bearing and the well-tube.

13. The combination of a pump-shaft, one or more runners carried thereby, cylinders in which said runners rotate, each of said cylinders being screw-threaded at its upper end and having a reduced scew-threaded extension at its lower end, a casing connected with the uppermost cylinder and inclosing the pump-shaft, and a well-tube receiving the liquid pumped from the uppermost cylinder.

14. The combination of a pump-shaft, one or more runners carried thereby, cylinders in which said runners rotate, each of said cylinders being screw-threaded at its upper end and having a reduced screw-threaded extension at its lower end, internally-projecting webs carried by said extension, a casing connected with the uppermost cylinder and inclosing the pump-shaft, and a well-tube receiving the liquid pumped from the uppermost cylinder.

15. The combination of a pump-shaft, one or more runners carried thereby, cylinders in which said runners rotate, each of said cylinders being screw-threaded at its upper end and having a reduced screw-threaded extension at its lower end, a well-tube within which said cylinder or cylinders is supported, the internal diameter of said well-tube being greater than the external diameter of said cylinders, and means supporting said cylinders in the well-tube.

16. The combination of a pump-shaft, one or more runners carried thereby, cylinders in which said runners rotate, each of said cylinders being screw-threaded at its upper end and having a reduced screw-threaded extension at its lower end, a well-tube within which said cylinder or cylinders is supported, the internal diameter of said well-tube being greater than the external diameter of said cylinders, forming a chamber surrounding said cylinders, means for closing the upper end of said chamber, and means supporting said cylinders in the well-tube.

17. The combination of a pump-shaft, one or more runners carried thereby, cylinders in which said runners rotate, each of said cylinders being screw-threaded at its upper end and having a reduced screw-threaded extension at its lower end, a well-tube within which said cylinder or cylinders is supported, the internal diameter of said well-tube being greater than the external diameter of said cylinders, forming a chamber surrounding said cylinders, packing for closing the upper and lower ends of said chamber, and means supporting said cylinders in the well-tube.

18. A deep-well pump, comprising a pump-shaft, a plurality of runners carried thereby, a plurality of cylinders connected together in series and respectively surrounding the several runners, bearings for said shaft connected with the upper and lower ends of the series of cylinders, and packing between the upper end of the series of cylinders and the well-tube.

19. The combination with a well-tube, of a foundation secured therein, a packing sleeve above said foundation, a tapered sleeve engaging said packing, a cylinder section connected with said sleeve, a pump-shaft extending through said cylinder section and having a runner carried thereby, a bearing for said shaft carried by said sleeve, an upper bearing for said shaft above the runner, packing between the upper bearing and the well-tube, and a casing connected with said upper bearing and inclosing the upper portion of the pump-shaft.

20. A deep-well pump, comprising a pump-shaft, a plurality of runners carried thereby, a plurality of cylinders connected together in series and respectively surrounding the several runners, bearings for said shaft connected with the upper end of the series of cylinders, packing between the upper end of the series of cylinders and the well-tube, a casing inclosing the pump-shaft above the upper bearing, and means independent of the pump-shaft for securing the several cylinders in position thereupon.

21. The combination of a well-tube, a pump-shaft, a runner carried thereby, a bearing for said shaft above said runner, a sectional tube inclosing said shaft and bearing adjacent ends of said sectional tube non-rotatably engaging said bearing and external means carried by said sectional tube for coupling the sections thereof together and centering the same in the well-tube, said coupling means having a sliding fit in said well-tube.

22. The combination with a well-tube, of a pump-shaft, means carried by said shaft for elevating the water in the well-tube, a sectional tube inclosing said shaft, and means carried by the latter tube for coupling the sections thereof together and centering the same in the well-tube and having vertically-extended bearing-plates adapted to engage the well-tube, said bearing-plates having a sliding fit in said well-tube.

23. The combination of a well-tube, a pump-shaft, a runner carried thereby, a bearing for said shaft above said runner, a sectional tube inclosing said shaft and said bearing, a sleeve screwed on the adjacent ends of said sectional tubes, and bearing-plates carried by said sleeve engaging the well-tube and having a sliding fit therein.

24. The combination of a well-tube, a pump-shaft, a runner carried thereby, a bearing for said shaft above said runner, a sectional tube inclosing said shaft and said bearing, the adjacent ends of said sectional tube having a tight engagement with said bearing whereby it is held against rotation, a sleeve screwed on the said adjacent ends of said sectional tubes, and bearing-plates carried by said sleeve engaging the well-tube and having a sliding fit therein.

25. The combination of a well tube, and pumping means extending down into said well tube and adapted to be readily lifted therefrom, said pumping means comprising a rotary pump shaft, a casing about said shaft, a runner below said casing adapted to be rotated by said shaft, a cylinder in said well tube about said runner having its wall spaced away from the walls of the well tube, and a packing between the upper end of the cylinder and the wall of the well tube, the annular chamber between the well tube and the cylinder being in communication at its upper end below the said packing with the interior of the shaft casing and being in communication at its lower end with the water supply passage of the pump below the runner.

26. The combination of a well tube, and pumping means extending down into said well tube and adapted to be readily lifted therefrom, said pumping means comprising a rotary pump shaft, a casing about said shaft, a bearing member closing the lower end of said casing about said shaft, a runner below said casing adapted to be rotated by said shaft, a cylinder in said well tube about said runner having its walls spaced away from the wall of the well tube, and a packing between the upper end of the cylinder and the wall of the well tube, said bearing member being provided with a passage therethrough leading from the shaft to the upper end of the annular chamber between the well tube and the cylinder whereby the interior of the casing communicates through the bearing with the said annular chamber which communicates at its lower end with the water supply passage of the pump below the runner.

27. The combination of a well tube, and pumping means extending down into said well tube and adapted to be readily lifted therefrom, said pumping means comprising a rotary pump shaft, a casing about said shaft, a bearing for said shaft at the lower end of said casing, a runner carried by said shaft below said bearing, a cylinder in said well tube about said runner having its walls spaced away from the walls of the well tube, and packings between the ends of the cylinder and the well tube, the annular chamber between the well tube and the cylinder being in communication at its upper end with the interior of the shaft casing through the lowermost bearing and being in communication at its lower end with the interior of the cylinder.

28. The combination of a well tube, and pumping means extending down into said well tube and adapted to be readily lifted therefrom, said pumping means comprising a rotary pump shaft, a runner carried by said shaft, a cylinder in which said runner rotates, and packings between the well tube and the upper and lower ends respectively of said cylinder, a passage being provided between said packings opening upon the shaft at the upper end of the cylinder and opening into the cylinder below the runner.

29. The combination of a well tube, and pumping means extending down into said well tube and adapted to be readily lifted therefrom, said pumping means comprising a pump shaft, a casing thereabout protecting said shaft from the liquid being pumped, a cylinder supported by said casing, and a runner carried by said shaft rotatable in said cylinder, a passageway being provided from the casing above said runner to the water supply passage of the pump below the runner.

30. The combination of a well tube, and pumping means extending down into said well tube and adapted to be readily lifted therefrom, said pumping means comprising a pump shaft, a casing about said pump shaft serving to protect the shaft from the liquid being pumped, a cylinder supported by said casing, a runner in said cylinder adapted to be rotated by said shaft, a passageway being provided leading from the interior of the casing at its lower end about the shaft and about the cylinder within the well tube to the water supply passage of the pump below the runner, and a packing larger than the cylinder serving to make a tight joint between the upper end of the cylinder and the well tube.

31. The combination of a well tube, and pumping means extending down into said well tube and adapted to be readily lifted therefrom, said pumping means comprising a rotary pump shaft, a casing thereabout protecting said shaft from the liquid being pumped, a cylinder supported by said casing having an inwardly-extending annular ring supported therein, a runner mounted on said shaft and rotatable therewith in said cylinder, and means for adjusting said pump shaft up and down in said well tube for adjusting the runner relative to the said ring.

MATTHEW T. CHAPMAN.

Witnesses:
JOHN L. JACKSON,
MINNIE A. HUNTER.